United States Patent [19]

Scheps

[11] Patent Number: 5,333,142
[45] Date of Patent: Jul. 26, 1994

[54] TECHNIQUE FOR INTRACAVITY SUM FREQUENCY GENERATION

[75] Inventor: Richard Scheps, Del Mar, Calif.

[73] Assignee: The United States of America as represented by the Secretary of the Navy, Washington, D.C.

[21] Appl. No.: 108,131

[22] Filed: Aug. 12, 1993

Related U.S. Application Data

[63] Continuation-in-part of Ser. No. 970,328, Oct. 26, 1992, Pat. No. 5,276,695.

[51] Int. Cl.$^5$ ............................................. H01S 3/109
[52] U.S. Cl. ..................................... 372/22; 359/328; 372/20; 372/23
[58] Field of Search ............................ 372/20-23,97, 372/100, 108; 359/326-330

[56] References Cited

U.S. PATENT DOCUMENTS

| | | | |
|---|---|---|---|
| 3,603,685 | 9/1971 | Heflinger et al. | 372/20 X |
| 3,975,693 | 8/1976 | Barry et al. | |
| 4,637,026 | 1/1987 | Liu | |
| 4,639,923 | 1/1987 | Tang et al. | 372/21 |
| 4,791,631 | 12/1988 | Baumert et al. | |
| 4,879,723 | 11/1989 | Dixon et al. | |
| 5,025,446 | 6/1991 | Kuizenga | |
| 5,038,352 | 8/1991 | Lenth et al. | 372/21 |
| 5,070,505 | 12/1991 | Dixon | |
| 5,095,491 | 3/1992 | Kozlovsky et al. | 372/21 X |

OTHER PUBLICATIONS

G. D. Boyd and D. A. Kleinman, *Journal of Applied Physics*, vol. 39, No. 8, pp. 3597 to 3639 1968 (Jul).
K. Kato, IEEE J. Quantum Electronics, vol. QE-24, No. 1, pp. 3-4, Jan. 1988.
J.-C. Baumert, F. M. Schellenberg, W. Lenth, W. P. Risk and G. C. Bjorklund, *Appl. Phys. Lett.*, vol. 51, No. 26, pp. 2192-2194, Dec. 1987.
W. P. Risk, J.-C. Baumert, G. C. Bjorklund, F. M. Schellenberg and W. Lenth, Appl. Phys. Lett., vol. 52, No. 2, pp. 85-87, Jan. 1988.
D. W. Anthon and G. J. Dixon, M. G. Ressl, and T. J. Pier, *Proceedings of the SPIE*, vol. 898, pp. 68-69, 1988.
W. P. Risk and W. Lenth, *Appl. Phys. Lett.*, vol. 54, No. 9, pp. 789-791, Feb. 1989.
P. N. Kean and G. J. Dixon, *Optics Letters*, vol. 17, No. 2, pp. 127-129, Jan. 1992.
W. P. Risk and W. J. Kozlovsky, *Optics Letters*, vol. 17, No. 10, pp. 707-709, May 1992.
H. S. Pilloff, *Appl. Phys. Lett.* vol. 21, No. 8, pp. 339-340, Oct. 1972.

(List continued on next page.)

*Primary Examiner*—John D. Lee
*Attorney, Agent, or Firm*—Harvey Fendelman; Thomas Glenn Keough

[57] ABSTRACT

A means for intracavity sum frequency generation is described in which a laser operates simultaneously at two wavelengths. The laser resonator further contains a sum frequency generating nonlinear crystal which is oriented for efficient sum frequency generation of the two fundamental wavelengths. The optical alignment of the resonator provides a region where both fundamental wavelengths are overlapped and are focused. The nonlinear sum frequency generating crystal is placed near this focus in the region where both wavelengths are spatially superimposed, producing the sum frequency of the two wavelengths. Line narrowing of the individual two fundamental wavelengths produces a line narrowed sum frequency generated output. Mirror coatings on all reflective elements are highly reflective for both fundamental wavelengths to produce a high intracavity fluence at both of these frequencies. Sum frequency generation at 459 nm is demonstrated in a non-critically phase matched Type II KTP crystal by operating a Ti:sapphire laser simultaneously at 808 nm and 1.064$\mu$. In order to achieve simultaneous operation at both wavelengths a 1.064$\mu$ signal may be injected into the resonator from an external source, such as a Nd:YAG laser. A doubled Nd:YAG laser may be used to optically excite the Ti:sapphire laser while simultaneously injecting 1.064$\mu$ radiation into the laser cavity.

27 Claims, 2 Drawing Sheets

OTHER PUBLICATIONS

C. Wu and J. R. Lombardi, *Optics Communications,* vol. 7, No. 3, pp. 233–236, Mar. 1973.

H. Lotem and R. T. Lynch, Jr., *Appl. Phys. Lett.,* vol. 27, No. 6, pp. 344–346, Sep. 1975.

G. S. Kruglik, P. N. Nazarenko, N. V. Okldnikov, G. A. Skripko and A. A. Stavrov, *Atmospheric Optics,* vol. 2, No. 8, pp. 729–734, Aug. 1989.

S. G. Bartoshevich, I. V. Mikhnyuk, G. A. Skripko and I. G. Tarazevich, *IEEE. J. Quantum Electronics,* vol. 27, No. 10, pp. 2234–2237, Oct. 1991.

Richard Scheps and J. F. Myers, *IEEE Photonics Technology Letters,* vol. 4, No. 1, pp. 1–3, Jan. 1992.

S. Singh, in *Handbook of Laser Science and Technology,* M. J. Weber, Ed., CRC Press, Boca Raton, Fla., vol. 3, pp. 3–21, 1986.

TECHNIQUE FOR INTRACAVITY SUM FREQUENCY GENERATION

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATIONS

This is a continuation-in-part of a co-pending U.S. patent application Ser. No. 07/970,328 entitled "A Multifrequency, Rapidly Sequenced or Simultaneously Tunable Laser" filed Oct. 26, 1992 (now U.S. Pat. No. 5,276,695).

BACKGROUND OF THE INVENTION

The present invention relates to lasers and nonlinear frequency conversion techniques and, particularly, to a technique to convert infrared radiation to visible radiation using intracavity sum frequency generation.

Solid state lasers are a class of lasers which contain a solid state gain element. The gain element generally consists of a host material, which can be either a crystalline or amorphous or glass-like material, and a dopant or impurity ion distributed within the host material. The dopant ion, which is typically a transition element or rare earth element, is the primary determinant of the wavelength or wavelengths over which the laser can emit radiation. Typically, solid state lasers operate in the infrared region, that is, between 700 nm and 3 $\mu$.

However, it is desirable for numerous applications to use a visible laser. Because of the convenience of the solid state laser gain medium compared to either gaseous or liquid gain media, techniques have evolved to convert the infrared fundamental radiation from the solid state gain medium to visible radiation. Nonlinear optical conversion is commonly used to produce visible radiation from solid state lasers operating in the near infrared (IR). Wavelength in the blue are of particular interest for applications such as display technology, optical data storage, and underwater applications. The most common nonlinear optical conversion technique is a process called second harmonic generation, or doubling, in which the laser wavelength is directed through a nonlinear optical material. The emerging laser beam is at one-half the wavelength of the initial laser beam.

An important parameter for a nonlinear crystal is the phase matching condition. Optimum conversion from the fundamental wavelength to the second harmonic wavelength will occur when the wave vector mismatch between the fundamental wave and the generated wave is zero. This condition is termed "phase matching". Phase matching may be achieved in an anisotropic crystal by a suitable choice of direction of propagation and polarization relative to the crystalline axes.

Two different types of phase matching can occur in crystals. Type I phase matching refers to the process where the two fundamental waves have the same polarization. Type II phase matching occurs when the fundamental waves have orthogonal polarizations. Phase matching is achieved as a result of the dispersion of the nonlinear crystalline host. Dispersion refers to the dependence of the refractive index of a given material on wavelength. Therefore, a phase matched crystal is one which is phase matched for a specific nonlinear operation. For example, for second harmonic generation of Nd:YAG laser wavelength from 1.064$\mu$ to 532 nm one requires that the refractive index at 1.064$\mu$ and the refractive index in the same material at 532 nm be such that the phase relationship between the fundamental wavelength and the generated second harmonic wavelength remain unchanged as the two waves propagate along the length of the crystal.

When phase matched second harmonic generation is achieved by propagating the fundamental wavelength along a direction different from a principal axis of a birefringent crystal it is termed "critical phase matching." When critical phased matched second harmonic generation is used with a focused beam, there is a phase mismatch of the wave vector for small deviations from the phase match direction due to the finite divergence of the beam. Because the efficiency of the nonlinear conversion process is a function of the power density within the nonlinear crystal, focusing is generally desirable to achieve high conversion efficiency.

When the phase matching angle is 90 degrees for a particular nonlinear process in a given material, it is termed "noncritical phase matching" (NCPM). In such a case, effects of beam divergence vanish. That is to say, a strongly focused beam in an NCPM crystal does not have the phase mismatch problems as is evident in critical phase matching. In addition, the walk-off angle which is the direction of energy flow of the fundamental and second harmonic beams, is zero, meaning that these two beams propagate collinearly within the crystal. It is obvious, then, that NCPM is the most favored and desirable means of operating a nonlinear material. One means by which NCPM can be obtained is by adjusting the temperature of the nonlinear crystal to the point where the refractive index of the fundamental wavelength equals that of the second harmonic wavelength.

Second harmonic generation is a special case of a more general nonlinear optical conversion process known as sum frequency generation. In second harmonic generation, two waves of the same wavelength are combined to produce a single wave of a wavelength one-half the original fundamental wavelength. In sum frequency generation two fundamental waves of different wavelengths are combined to produce a single wave. The wavelength produced by sum frequency generation is determined by the following equation:

$$\frac{1}{\lambda_1} + \frac{1}{\lambda_2} = \frac{1}{\lambda_3} \tag{1}$$

where $\lambda_1$ represents one of the fundamental wavelengths, $\lambda_2$ represents the second of the fundamental wavelengths and $\lambda_3$ represents the converted or summed wavelength. It can be seen, then, that second harmonic generation is a degenerate case of sum frequency generation where $\lambda_1 = \lambda_2$. The fundamental principles of nonlinear optics summarized briefly above are well known and are discussed in detail in the literature. See, for example, G. D. Boyd and D. A. Kleinman, *Journal of Applied Physics*, vol. 39, p. 3597, 1968.

Although doubling can be an efficient means for conversion to the blue, the nonlinear optical material KTiOPO$_4$ (KTP) is non-critically phase matched at room temperature for sum frequency generation (SFG) at 808 nm and 1.064$\mu$, see, for example, K. Kato, IEEE J. Quantum Electronics, vol. QE-24, p. 3, 1988. The generated wavelength is 459 nm. There are several compelling advantages to recommend the SFG process over direct doubling to 459 nm. For one, the required fundamental wavelengths can be obtained efficiently. Nd:YAG operates at $1.064\mu$ while several lasers, including $Ti^{3+}$:sapphire, AlGaAs laser diodes and $Cr^{3+}$-doped crystals produce efficient output at 808 nm. In addition, KTP is a robust, mature and efficient nonlinear crystal which is readily available in excellent quality from a number of commercial suppliers. And finally, KTP has an exceptionally wide angular and temperature bandwidth for non-critical phase matched sum frequency generation; see, for example, J. -C. Baumert, F. M. Schellenberg, W. Lenth, W. P. Risk and G. C. Bjorklund, *Appl. Phys. Lett.*, vol. 51, p. 2192, 1987.

Typically, sum frequency generation requires two different laser sources. Because the efficiency of the sum frequency generation process depends on the power density within the optical crystal for CW operation, one requires extremely small focused spot sizes within the nonlinear sum frequency generating crystal. Using two different laser sources generally leads to problems involving the alignment of the beams to the high degree of accuracy required by the small spot sizes within the nonlinear crystal. In addition, when using two separate laser sources, there are inefficiencies that result from mismatching of the spatial modes of the two lasers in terms of size, shape and intensity distribution.

One technique for avoiding the use of two separate lasers for the sum frequency generation process in which 808 nm and $1.064\mu$ are combined to produce 459 nm blue output is to use a diode pumped Nd:YAG laser which uses the residual (unabsorbed) 808 nm pump radiation for sum frequency generation. See, for example, W. P. Risk, J.-C. Baumert, G. C. Bjorklund, F. M. Schellenberg and W. Lenth, *Appl. Phys. Lett.*, vol. 52, p. 85, 1988. In this type of sum frequency generation a laser diode at 808 nm is used to pump a Nd:YAG laser which operates at $1.064\mu$. The residual or unabsorbed 808 nm pump light is then circulated within the Nd:YAG laser resonator cavity which also includes a sum frequency generation KTP crystal. In such a system there is only one active laser, the laser diode. Since the Nd:YAG is optically excited by the laser diode and in essence serves as a frequency conversion device to convert some of the 808 nm light to $1.064\mu$ light, in this manner one might conclude that sum frequency generation is achieved with the use of only one active laser. A patent by Baumert et al., U.S. Pat. No. 4,791,631, describes this concept in detail. A variation on this type of sum frequency generation process is to have an additional laser diode or laser diodes which are not used to pump the Nd:YAG directly but are used to introduce additional 808 nm light into the laser resonator which contains the Nd:YAG crystal and the KTP nonlinear crystal. In this case a separate laser diode is used to pump the Nd:YAG laser.

It should be noted that for CW sum frequency generation the use of the KTP crystal within a resonator is essentially a requirement which stems from the necessity of having very nigh power densities to achieve efficient generation of 459 nm light. Therefore, the KTP crystal used for cw sum frequency generation usually receives focused light at 808 nm and $1.064\mu$ within a resonator cavity. Using the KTP crystal inside a cavity is desired because the light contained within a cavity, which is forced by highly reflective end elements to oscillate back and forth, will have a much higher power and therefore power density than light outside the cavity.

A second patent by Dixon et al. U.S. Pat. No. 4,879,723 describes another version of the concept patented earlier by Baumert et al. In the Dixon et al. patent a laser diode pumped Nd:YAG laser is established in a cavity containing the KTP crystal similar to the Baumert patent. In addition, the output of a second laser diode is introduced into this same cavity to provide a separate source of 808 nm fluence. In the Dixon et al. patent a possibility of high modulation rate of the 459 nm light is considered.

Sum frequency generation utilizing a laser diode has a unique set of difficulties, particularly for scaling to a higher power. These difficulties stem from the broad spectral bandwidth and poor beam quality that is typically associated with high power laser diodes. Laser diodes on the order of 1 Watt or more are typically multi-spectral devices which limit the efficiency of sum frequency generation at a specific blue-green wavelength. In addition, these high power laser diodes typically are multi-transverse mode devices, as they arise from gain-guided wide-stripe architectures. As a consequence of the large number of transverse modes, it is not possible to focus the output of the high powered 808 nm laser diode into a small enough spot to produce efficient sum frequency generation. In addition, the spatial mismatch between the focus spot of a typically astigmatic high transverse mode laser diode and a $TEM_{00}$ output of a Nd:YAG laser further prohibits good efficiency when one is trying to obtain high power.

For CW sum frequency generation in which 808 nm and 1.064 nm are summed to produce 459 nm by using a KTP nonlinear crystal, an additional problem arises in the types of approaches represented by the Dixon et al. and Baumert et al. patents cited above. In those two patents, the cavity which is used to resonate the two fundamental wavelengths at 808 nm and $1.064\mu$ to produce the high intracavity fluences required for efficient frequency generation also contains the Nd:YAG laser gain element. However, the Nd:YAG element absorbs strongly at 808 nm and therefore limits the intracavity fluence at that wavelength. Subsequently the overall conversion efficiency is reduced. Several variations on the general techniques proposed by the Dixon et al. and Baumert et al. patents have been published, all of which suffer from the problem of having a Nd:YAG absorbing gain element within the cavity with which one is trying to obtain high intracavity fluence at 808 nm. See, for example, D. W. Anthon and G. J. Dixon, M. G. Ressl, and T. J. Pier, *Proceedings of the SPIE*, vol. 898, p. 68, 1988; W. P. Risk and W. Lenth, *Appl. Phys. Lett.*, vol. 54, p. 789, 1989; and P. N. Kean and G. J. Dixon, *Optics Letters*, vol. 17, p. 127, 1992.

Since good efficiency dictates the use of intracavity sum frequency generation (or "mixing") to take advantage of the high circulating power, absorption of the 808 nm fluence in the cavity by the Nd:YAG gain element contained within that cavity will counteract the enhancement of the 808 nm fluence within the cavity and reduce the overall conversion efficiency. One solution to the problem has been suggested in which optically thin Nd:YAG slabs are used which do not absorb as strongly in a single pass as typically much longer Nd:YAG rods do. See, for example, P. N. Kean and G. J. Dixon, *Optics Letters*, vol. 17, p. 127, 1992. The use of the optically thin slab mitigates the problem but does not eliminate the intracavity absorption of 808 nm fluence.

A different type of solution has been proposed in which sum frequency generation occurs in an external cavity. In this type of approach a laser diode pumped Nd:YAG laser is established. The output of this laser is introduced into a second resonator cavity which contains only a KTP crystal and highly reflective mirrors. The 1.064μ fluence from the diode pumped Nd:YAG laser circulates in this cavity. In addition, the output of the laser diode at 808 nm is also introduced into the resonator containing only the KTP crystal. Thus, both 1.064μ and 808 nm fundamental radiation can circulate with high power density and produce efficient 459 nm radiation. See, for example, W. P. Risk and W. J. Kozlovsky, *Optics Letters*, vol. 17, p. 707, 1992. However, it is to be noted that generation in an external cavity, although circumventing the absorption problem in which the Nd:YAG gain element absorbs the 808 nm circulating fluence, introduces the alignment and mode matching difficulties which were referred to above. This sort of technique for generating 459 nm light is therefore subject to losses in efficiency due to spatial overlap of two beams from two separate lasers.

Thus in accordance with this inventive concept, a continuing need has been found in the state of the art for a technique for intracavity sum frequency generation using 808 nm and 1.064μ to produce 459 nm output with a nonlinear crystal composed of KTP which is efficient, scalable to higher powers, insensitive to alignment problems, arises from a single laser source, and contains no elements within the cavity that reduce the intracavity fluence at 808 nm.

SUMMARY OF THE INVENTION

The present invention is directed to providing a technique for intracavity sum frequency generation in which a laser resonator is constructed capable of operating at two wavelengths simultaneously and providing a region within the resonator where both wavelengths are spatially superimposed. A nonlinear sum frequency generating crystal is placed within the resonator region where the two wavelengths are superimposed, allowing the sum frequency generated wavelengths to be efficiently produced. A laser resonator is made up of two end reflective elements, two curved fold mirrors and an output coupler reflective element to form a reflective path and define a laser resonator cavity. A laser gain element is disposed in the reflective path in the laser resonator cavity and a means for optically exciting the laser crystal is appropriately disposed to pump the laser gain element and produce a laser emission in a preselected range of wavelengths.

An element for wavelength dispersion such as a prism is disposed in the reflective path in the laser resonator cavity between one fold mirror and the end reflective elements for tuning the laser emission to at least one desired wavelength in the preselected range of wavelengths. Two curved fold mirrors focus the laser resonator cavity mode energy within the laser gain element. These mirrors also serve to collimate the laser resonator cavity mode in other regions of the laser resonator cavity. The laser resonator cavity mode is collimated as it passes through the prism to optimize the wavelength dispersion performance of the prism.

The tunable laser can further include elements for line narrowed operation at one or more wavelengths, and shutters, apertures or the like to prevent operation temporarily at one or more wavelengths. In addition, the laser can contain polarization rotating plates capable of rotating the polarization of one or more wavelengths operating within the laser cavity with respect to one another. In the region where both wavelengths are spatially overlapped and come to a focus, a nonlinear optical material such as KTP may be placed for the purpose of generating the sum frequency wavelength from the two fundamental wavelengths oscillating within the laser resonator cavity. With appropriate coatings on all reflective and transmissive elements the two fundamental wavelengths are contained within the laser resonator cavity while the sum frequency generated wavelength can be emitted through the output coupler of the laser resonator.

By end pumping the laser crystal a "gain aperture" is created in the laser gain element which allows the laser to operate only at the lowest order spatial transverse mode at the desired wavelengths in the preselected range of wavelengths. The design of the laser resonator cavity provides spatial separation of the wavelengths operating simultaneously in one part of the laser resonator cavity and yet provides collinear superposition of the laser wavelengths in another part of the laser resonator cavity. The tuning element can be a Brewster angle dispersive prism placed in minimum deviation.

The nonlinear optical material is placed in a region of the resonator where both wavelengths are spatially overlapped. In addition, the resonator mode contains a waist at this location, and the polarization of the fundamental wavelengths is oriented appropriately for optimum sum frequency generation. Thus the sum frequency generating process will demonstrate high efficiency as the cavity power density within the resonator a the focus is very high. The spatial intensity profile for both fundamental wavelengths is close to identical, further enhancing the sum frequency generation efficiency.

OBJECTS OF THE INVENTION

Accordingly, an object of the invention is to provide a laser which produces two wavelengths simultaneously and contains a nonlinear crystal within the laser cavity to convert the intracavity fluence at the two fundamental wavelengths to a third wavelength by means of sum frequency generation.

Another object of the invention is to provide a laser which produces 808 nm and 1.064μ radiation simultaneously and contains a nonlinear non-critically phase matched KTP crystal within the laser cavity to convert the intracavity fluence at the fundamental wavelengths to 459 nm cw output radiation by means of intracavity sum frequency generation.

Another object of the invention is to provide a means for generating tunable blue visible output near 459 nm by adjusting the wavelength of one or both fundamental wavelengths near 808 nm and 1.064μ.

Another object of the invention is to provide a laser which produces two fundamental wavelengths simultaneously and in which the polarization of one of the fundamental wavelengths is rotated 90 degrees with respect to the other fundamental wavelength to allow efficient Type II intracavity sum frequency generation in a Type II nonlinear sum frequency generating crystal contained within the laser cavity.

Yet another object of the invention is to provide an intracavity focus or waist near or within the sum frequency generating nonlinear crystal to produce a high power density within the sum frequency generating crystal.

Another object of the invention is to provide a laser resonator cavity which operates at two fundamental wavelengths simultaneously and lases in the lowest order spatial transverse mode at both wavelengths over a preselected wavelength range.

Another object of the invention is to provide a tunable CW laser resonator which produces laser emission at two or more wavelengths simultaneously and further contains an intracavity nonlinear sum frequency generating crystal to produce the sum frequency wavelength of the two fundamental wavelengths.

Another object of the invention is to provide a tunable solid state laser which operates at two or more wavelengths simultaneously in which part of the laser resonator cavity mode is collimated, allowing the use of an intracavity dispersive Brewster angle prism placed in minimum deviation configuration to determine the wavelengths that are simultaneously achieved and to further spatially isolate the two wavelengths so that one may be amplified or attenuated without affecting the intensity of the other.

Another object of the invention is to provide a line narrowed tunable solid state laser which produces simultaneous CW output at two wavelengths, the bandwidth of each frequency being substantially narrowed by the insertion of intracavity narrowing elements and which produce a line narrowed sum frequency generated wavelength.

Yet another object of the invention is to provide a tunable laser which operates at two or more wavelengths simultaneously and in which the laser resonator cavity mode contains a region where the two wavelengths are spatially overlapped or superimposed, that region further containing a nonlinear crystal for sum frequency generation such that the two wavelengths produced simultaneously are spatially superimposed within the nonlinear sum frequency generation crystal.

These and other objects of the invention will become more readily apparent from the ensuing specification and drawings when taken in conjunction with the appended claims.

DETAILED DESCRIPTION OF THE PREFERRED EMBODIMENTS

This inventive concept involves the implementation of an optical laser resonator cavity that will allow simultaneous CW laser oscillation at two laser wavelengths and in addition, includes a polarization rotating means and a nonlinear sum frequency generating crystal to produce efficient sum frequency output. This inventive concept is a continuation in part of the above referenced application in which a multifrequency, rapidly sequenced or simultaneous tunable laser is described.

The design of the optical laser resonator cavity disclosed herein is generic and could be used either in laser systems with discretely tunable or continuously tunable gain media. In addition, the design of the optical laser resonator cavity disclosed herein could be used with crystalline or noncrystalline amorphous or glass-like gain media as well as liquid gain media such as dye lasers or chelate lasers or gaseous gain media. The sum frequency generating process disclosed herein can be either Type I or Type II and can produce sum frequency wavelengths from the ultraviolet to the infrared. Furthermore, the sum frequency generating crystal can be critically phase matched or non-critically phase matched. The fundamental wavelengths can be line narrowed to produce line narrowed sum frequency generated output. Or they may be broadband, in which case a broadband sum frequency generated output is produced. The technique described herein is appropriate for both CW and pulsed laser operation.

The optical laser resonator cavity can be resonantly pumped or flash pumped. The wavelength range over which the laser system operates is determined by the nature of the laser gain medium as well as by the reflective coatings and transmission of the optical elements contained within the laser resonator cavity.

Figure 1:
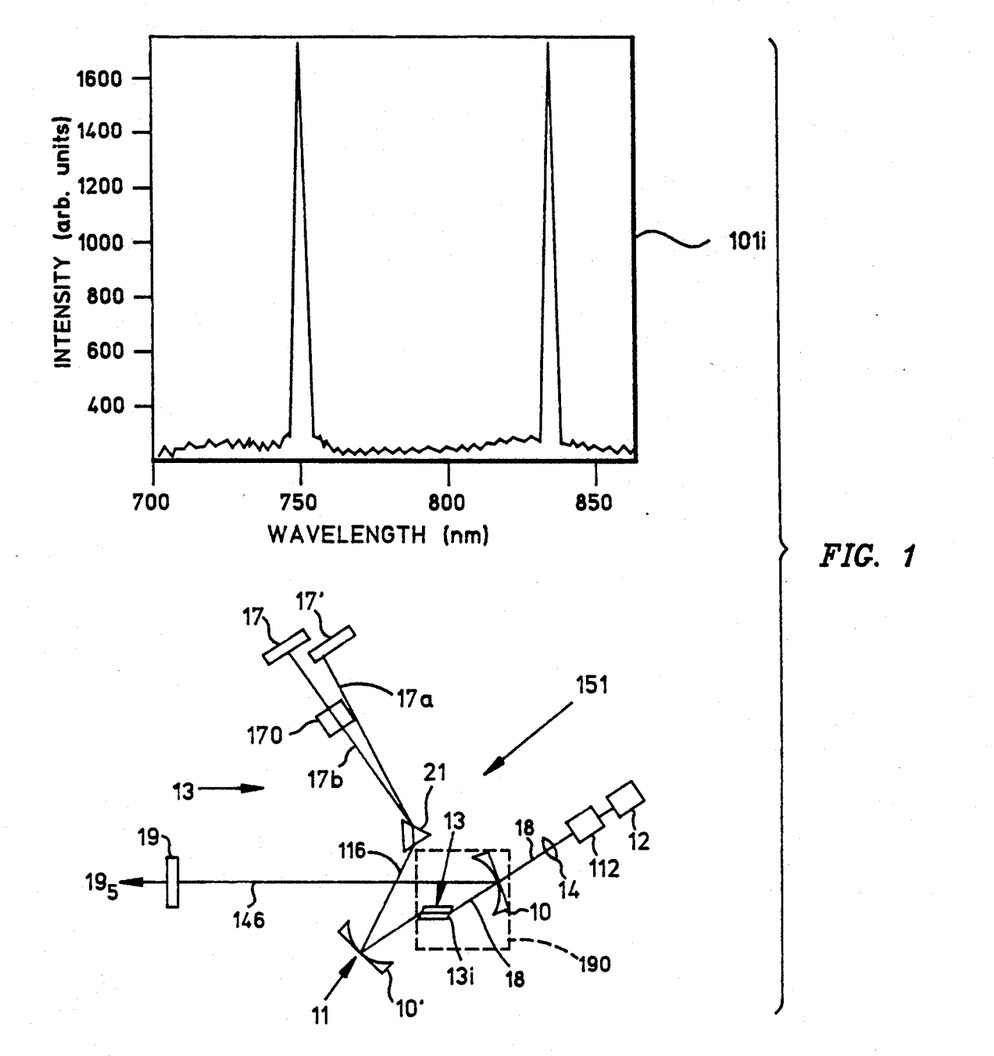
FIG. 1 illustrates the basic design of a two-wavelength Ti:sapphire laser and a graph depicting intensity versus wavelength thereof, respectively.

Referring now to the drawings wherein like reference numerals designate identical or corresponding parts throughout the several views, FIG. 1 illustrates a dual wavelength laser resonator used to obtain simultaneous two wavelength CW operation. Referring to FIG. 1, a tunable laser pumped solid state laser 11 includes a laser crystal 13 disposed in a resonator 15' defined by optically aligned end reflective elements or mirrors 17 and 17', concave fold reflective elements 10 and 10', and an output coupler reflective element mirror 19 in a reflective path in a laser cavity 15. As an aid for understanding the dual wavelength laser resonator illustrated in FIG. 1 it will be described in terms of operating at two frequencies simultaneously between 700 and 850 nm. This laser, which is described in more detail in the above referenced co-pending patent application produces two wavelengths simultaneously collinearly through output coupler 19 in a wavelength range between 700 and 850 nm. Mirrors 17 and 17' are highly reflective while the mirror 19 is partially transmissive to a laser wavelength of approximately 700 to 850 nm to provide the output coupling for the laser emission within the wavelength range from about 700 nm to 850 nm from tunable laser 11.

For ease of understanding of the invention, tunable laser 11 of FIG. 1 is described in terms of a tunable solid state laser pumped by an argon ion laser 12 and having a laser rod or crystal 13 of an exemplary $Ti^{3+}$-activated sapphire host material to produce a laser beam or emission which can be tuned within the wavelength range of about 700 nm to $1.1\mu$. It should, however, be remembered that a different wavelength range can be realized by utilizing different reflective coatings on optical elements 17, 17', 10, 10' and 19, or by utilizing a laser gain element 13 which contains a different amplifying medium and different associated optical elements.

The Ti:sapphire laser is an ideal replacement for CW dye lasers that operate in the 700 nm to $1.1\mu$ range. Its broad tunability and high stimulated emission cross-section make it a particularly appropriate choice for applications that require two or more wavelengths simultaneously. The generation of multiple wavelengths was first demonstrated for pulsed dye lasers. See, for example, H. S. Pilloff, *Appl. Phys. Lett.,* vol. 21, p. 339, 1972; C. Wu and J. R. Lombardi, *Optics Communications,* vol. 7, p. 233, 1973; H. Lotem and R. T. Lynch, Jr., *Appl. Phys. Lett.,* vol. 27, p. 344, 1975. Dual wavelength operation of a pulsed Ti:sapphire laser has been reported, see for example, G. S. Kruglik, P. N. Nazarenko, N. V. Okldnikov, G. A. Skripko and A. A. Stayroy, *Atmospheric Optics,* vol. 2, p. 729, 1989; and S. G. Bartoshevich, I. V. Mikhnyuk, G. A. Skripko and I. G. Tarazevich, *IEEE. J. Quantum Electronics,* vol. 27, p. 2234, 1991. CW multifrequency operation of a tunable laser was demonstrated for the first time using a Ti:sapphire laser in a coupled cavity configuration, see for example, R. Scheps and J. F. Myers, *IEEE Photonics Technology Letters,* vol. 4, p. 1, 1992.

A dispersive Brewster angle prism 21 is inserted into laser resonator cavity 15 between the fold mirror 10' and the end reflective mirrors 17 and 17'. Feedback path 17a is spatially separate from feedback path 17b between prism 21 and highly reflective mirror 17'. Similarly, feedback path 17b is spatially separate from feedback path 17a between prism 21 and highly reflective mirror 17. Feedback along path 17a may be at a substantially different wavelength than feedback along path 17b.

By inserting a high dispersion prism between the gain element 13 and the highly reflective flats 17 and 17', separate feedback paths are established for each wavelength. The use of a Brewster angle prism in minimum deviation provides low insertion loss while minimizing amount of astigmatism introduced. The resonator mode is collimated as it passes through prism 21. Angular rotation of one of highly reflective flats 17 or 17' allows tuning of one wavelength while leaving the other wavelength unaffected. Alternatively, tuning may be achieved by rotating prism 21. This changes both wavelengths simultaneously while maintaining a constant separation between the two wavelengths. An important feature of the resonator is that both wavelengths emerge from output coupler 19 simultaneously, collimated and spatially overlapped. In addition, the mode, shape and size for each wavelength are similar.

Argon ion laser 12 produces a pumping mode output. The pump laser output, rotated by polarization rotation optics 112, produces a collimated beam 18 that is transformed into a focused pumping beam 18' by a 25 centimeter lens 14, which focuses the argon ion laser output onto Ti:sapphire crystal 13. The pumping of laser crystal 13 is end pumped to improve the energy conversion efficiency and to assure TEM$_{00}$ operation.

The apparatus for end pumping the laser crystal 13 consists of pump laser 12, polarization rotation apparatus 112 and lens 14. In addition, a concave fold mirror 10 should not be plano-concave as is typically used for concave laser mirrors. Instead, the mirror should be concave-convex where the absolute value of the radii of curvature of both mirror surfaces are the same. This is commonly referred to as a "meniscus" lens. This type of mirror substrate is desirable for high efficiency end pumping since in conjunction with the proper selection of the focal length and position of focusing lens 14, it will provide virtually no distortion to the focused end pumping beam 18' as the beam passes through concave fold mirror 10. This will be true only when the radius of curvature of the focused pump beam matches the absolute value of the radii of curvature of both surfaces of meniscus mirror 10.

The importance of the region of the resonator where the wavelengths are spatially separated is that perturbations can be introduced that affect only one of the wavelengths. For example, the polarization of one wavelength may be rotated relative to the other. This could be important, for example, in a Type II intracavity nonlinear conversion process where the polarization of the two fundamental wavelengths must be oriented 90 degrees with respect to one another. In addition, a modulator can be inserted to provide amplitude modulation at one wavelength, or modulators at both wavelengths can be introduced to generate arbitrary phase and frequency relationships between the two outputs. In addition, etalons may be inserted to reduce the linewidth at only one of the wavelengths, or attenuators may be introduced to reduce the intracavity fluence at either wavelength. An alternative method of reducing the intracavity power at one wavelength is to replace the respective HR flat 17 or 17' with a partial reflector.

Dispersive Brewster angle prism 21 has uncoated faces and is oriented at Brewster's angle with respect to the laser resonator cavity mode 116. The prism material is a highly dispersive glass typical of the glasses that compose Faraday rotators, and the glass is specifically chosen to have minimum absorption over a preselected range of wavelengths. Suitable materials for the prism are commercially available and may include such glasses as Kigre Corporation M-16 glass and Schott glass SF 55. Concave fold mirrors 10 and 10' are provided with 10 centimeter radii of curvature that are used to concentrate the laser resonator cavity mode in crystal 13, which in this exemplary case is a 1.5 centimeter long Ti:sapphire laser crystal having Brewster angle faces. The Brewster angle faces ensure that the fundamental wavelengths oscillating in the laser resonator will be linearly polarized. The two concave fold mirrors are provided with exemplary broadband highly reflector coatings over the range of 670 nm to 850 nm. Two highly reflective mirrors 17 and 17' are also broadband coated to be highly reflective from 670 nm to 850 nm while output coupler 19 was appropriately treated in this exemplary case to be approximately 95 percent reflective over this wavelength range.

Independent tuning of each resonant wavelength is obtained by angular adjustment of each flat mirror 17 or 17'. The resulting tuning occurs only at the wavelength which is being fed back through prism 21 by the particular mirror that is being rotated. For example, rotating mirror 17' about the axis perpendicular to the plane of FIG. 1 will feed back a different wavelength to prism 21 along path 17a but will not affect the feedback wavelength of mirror 17.

Alternatively, prism 21 can be rotated to tune both wavelengths simultaneously. In tuning the wavelengths with the prism, the wavelength separation between the two resonant wavelengths is held constant while the individual wavelengths change simultaneously. Two separate feedback paths through the prism are provided by the pair of highly reflective end elements, mirrors 17 and 17'. The prism is typically oriented with respect to mirrors 17 and 17' so that the peak emission wavelength, in this exemplary case 780 nm, is beyond the interior edge of red mirror 17'. Mirror 17' is termed "red" because this mirror receives the longer wavelengths of the two wavelengths.

A sample trace of dual wavelength operation is shown in FIG. 1, labelled 101i. In this exemplary case dual wavelength operation is achieved CW simultaneously at 750 nm and 830 nm. The trace was acquired by introducing the output of tunable laser 11 which emerges through output coupler 19 into a spectrometer. The spectrometer used an optical multichannel analyzer as a detector. The trace in FIG. 1 is a recording of the laser output dispersed by a spectrometer and then incident on the optical multichannel optical analyzer.

Not all wavelength pairs that are contained within the laser tuning range are observed to operate simultaneously, and the range of frequencies over which simultaneous multifrequency operation can occur is determined primarily by gain competition. This prevents operation at two frequencies where the net gain (which is the gain minus all losses) for one wavelength is substantially lower than that of the other. When one of highly reflective flats 17 or 17' is blocked, the wavelength dependence of the monochromatic output power is due to the spectral variation of the net gain. This variation is well known and is typically called the tuning curve of a given laser. Since the pump power is the same for all output wavelengths taken to produce the tuning curve, the spectral dependence of the power for a given laser can be interpreted as a measure of the efficiency of producing one wavelength relative to another. The greater the difference in output efficiency between two wavelengths, the more difficult it is for the output wavelength with the lower efficiency to compete with that having the higher efficiency. Typically, for the dual wavelengths laser illustrated in FIG. 1, the wavelength pairs with the greatest probability of operating simultaneously CW are those which produce comparable single wavelength output power. This gain competition tends to limit the tuning range for dual frequency operation.

Figure 2:
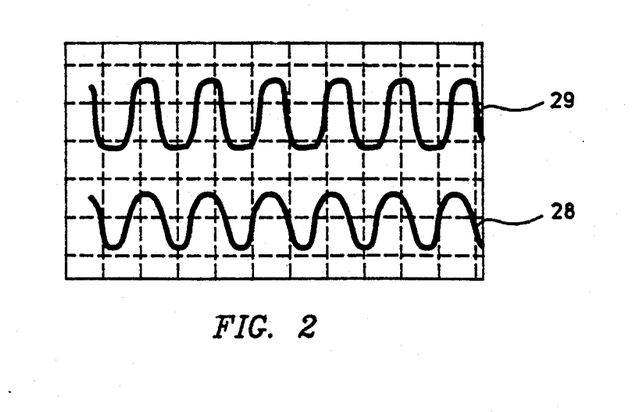
FIG. 2 illustrates an oscilloscope trace of both wavelengths chopped externally.

In order to verify that both wavelengths are produced simultaneously, the laser output emerging from output coupler mirror 19 is dispersed by a diffraction grating, and each wavelength is detected by a separate photodiode. Stable simultaneous CW output was observed at both wavelengths. A representative oscilloscope trace is shown in FIG. 2. In this figure simultaneous dual wavelength operation is occurring at 750 nm and 830 nm. Chopping is used to provide a baseline for the traces and the zero voltage location for each trace is indicated in the figure as "off." Time scale is 2 milliseconds per division. The upper trace, 29, depicts the 750 nm signal, while the lower trace, 28, depicts the 830 nm signal. It can readily be seen that both wavelengths are on simultaneously when the chopper is open and off simultaneously when the chopper is shut. In addition, long-term amplitude stable simultaneous CW operation was obtained at both 750 nm and 830 nm.

Line narrowed operation was obtained by inserting an etalon pair 170 in the collimated region of the resonator between prism 21 and highly reflective flat 17. The etalons in this exemplary case were 0.5 and 10 mm thick. The resulting linewidth was measured to be no greater than 450 MHz, the resolution limit of the measuring apparatus. The linewidth at the second wavelength was unaffected. It is also possible to narrow the linewidth of both wavelengths simultaneously by introducing the etalon pair in the collinear region of the resonator between output mirror 19 and fold mirror 10. Alternatively, an etalon pair or other line narrowing means can be inserted in the wavelength feedback path between prism 21 and highly reflective element 17' to produce line narrowing at the wavelength fed back by mirror 17'.

Figure 3:
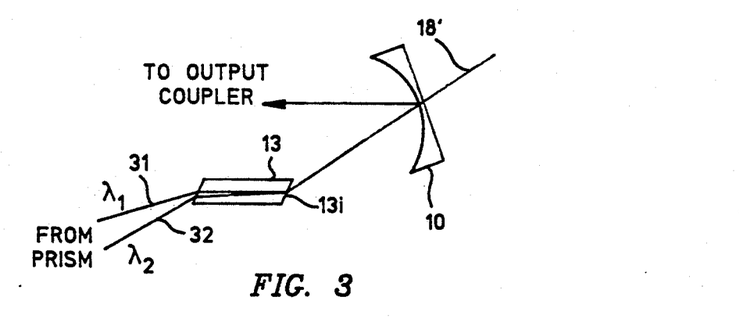
FIG. 3 illustrates spatial overlap of both wavelengths when the laser is properly aligned.

Spatial overlap between the mode axes for the two wavelengths is obtained only in the region of the resonator between output coupler 19 and the face of the Ti:sapphire laser crystal 13 closest to the output coupler. This face is labeled 13$i$ in FIG. 1. Owing to dispersion, the mode axes do not coincide in the gain element although the beam diameters are large enough to produce significant overlap. This is shown schematically in FIG. 3. In FIG. 3 a portion of laser resonator 15' from FIG. 1 is shown and includes the Ti:sapphire gain element 13 and the 10 centimeter radius of curvature fold mirror 10. The mode axes corresponding to the two wavelengths labeled 31 and 32 are shown as they proceed from prism 21 and concave fold mirror 10' to gain element 13. These two wavelengths are spatially separated by a small amount. Upon entering the first Brewster face of the laser gain element, they refract at different angles owing to the dispersion of the Ti:sapphire gain element.

By the time these axes reach the opposite face of the Ti:sapphire gain element, they are spatially overlapped but not collinear. Upon refraction through the second Brewster face in the direction of concave fold mirror 10 both wavelengths are now spatially collinear and remain so through reflection from concave fold mirror 10 to output coupler 19. For the fluence that is reflected back into laser resonator 15' by output coupler 19, these two wavelengths stay spatially collinear until they reach the first Brewster window of the Ti:sapphire gain element, at which point they refract and retrace their paths back towards concave fold mirror 10' and prism element 21.

To a certain extent, the fact that the two wavelengths interact with the population inversion in somewhat separate active volumes within the laser gain element 13 contributes to the observed stability for dual frequency operation. An additional contribution to the stability may arise from spatial hole burning which allows efficient extraction for one wavelength in regions in the active gain element corresponding to amplitude minima for the standing wave represented the other wavelength. Although each wavelength does not typically operate in a single longitudinal mode, the bandwidths for both wavelengths are relatively narrow, typically 0.01 nm.

A salient feature of the laser resonator cavity design shown in FIG. 1 should be reemphasized. This is that the laser resonator cavity mode can be thought of as having two distinct regions, one where the wavelengths are spatially separate, and the other where the wavelengths are spatially collinear. The region where the wavelengths are spatially separate extends from prism element 21 to highly reflective flats 17 and 17'. The region where the wavelengths are spatially collinear, as illustrated in FIG. 3, extends from the Brewster face of the Ti:sapphire laser gain element closest to concave fold mirror 10 (labelled 13$i$ in FIG. 1) to output coupler 19.

In the region where the wavelengths are spatially separated, one wavelength can be modulated without affecting the other. This can be done, for example, by insertion of a shutter or an electro-optic or acousto-optic Q-switch 170, as shown in FIG. 1. In addition, operation at one wavelength can be enhanced by insertion of amplifiers in path 17$a$ or 17$b$. Furthermore, the insertion of line narrowing elements in one wavelength path will narrow that wavelength without affecting the bandwidth of the other.

The importance of having a region where both wavelengths are spatially collinear is that for intracavity sum frequency generation where the two wavelengths are summed in a nonlinear crystal to produce a third, shorter wavelength, it is required that both wavelengths be spatially collinear through the nonlinear crystal. Part of the region where both wavelengths are collinear, particularly the region between concave fold mirror 10 and the Brewster face 13$i$ of the Ti:sapphire laser gain element closest to the concave fold mirror, contains a sharply focused laser resonator mode. This is the best location for the nonlinear crystal as the sum frequency conversion is a function of the power density of the fundamental wavelengths contained within the nonlinear crystal, and the region between concave fold mirror 10 and the Brewster window 13$i$ of gain element 13 closest to concave fold mirror 10 contains a region where the resonator mode is concentrated on its way to a focus in the center of laser gain element 13.

Optionally, pump laser 12 can be laser diodes, aluminum gallium arsenide or indium gallium arsenide or aluminum gallium indium phosphide or can be other CW laser sources such as a doubled Nd:YAG laser or a dye laser, for example, or any other source, the output of which is absorbed by laser crystal 13. In addition, laser crystal 13 can be any length. In the exemplary case it is 1.5 centimeters long. The length is selected to provide adequate gain at the desired operating wavelength and adequate absorption of the pump laser fluence. In addition to addressing the length, the concentration of the dopant material is adjustable. In the preferred embodiment of the Ti:sapphire laser the doping density is 0.15 percent by weight. Densities as high as 0.25 percent of $Ti^{3+}$ by weight may be used, and for other dopant and host combinations the dopant density generally will be adjusted such that the absorption of pump light by the crystal, which is determined by the optical path of the pump light through the crystal, is sufficiently high, usually in the range of 80 to 100 percent, while the gain minus the passive losses in the crystal is adequate to provide operation over a predetermined range of wavelengths.

In addition, non-laser sources such as arc lamps or CW filament lamps or flash lamps or other gas filled lamps can be used to excite the laser crystal. For pulsed excitation the output of the laser fabricated in accordance with this inventive concept will be pulsed. For CW excitation the operation will be either CW or pulsed depending on whether elements for interrupting CW operation are inserted into the laser resonator cavity. Multifrequency operation in the pulsed mode generally will occur simultaneously during the laser output pulse.

Mirror coatings are important factors for determining the net gain as a function of the wavelength of the laser. This is an important consideration when operation at two wavelengths as desired where the stimulated emission cross-sections for each wavelength is very different. As mentioned previously, wavelengths pairs where the net gain is approximately the same are the most likely pairs to operate simultaneously. The net gain curve can be tailored to obtain the desired multifrequency operation at any two wavelengths by adjusting the mirror reflectivities at the two desired wavelengths either to reduce the net gain that a wavelength where the stimulated emission cross section is much higher than that at the other wavelength, or to increase the net gain at a wavelength where the stimulated emission cross-section is much lower than the other.

Selecting reflectivities for mirrors 17, 17', 10, 10' and 19 in FIG. 1 such that the reflectivity is enhanced or degraded at specific wavelengths, will allow operation at selected wavelength pairs within the tuning range capability of the laser. Any wavelength pair over the range for which laser crystal 13 can operate can be produced simultaneously by tailoring the spectral reflectivity of the optical elements in the manner just described. In the exemplary case of Ti:sapphire the tuning range is 680 nm to 1.1$\mu$ and the reflectivity of flat output coupler 19, fold mirrors 10 and 10' and flat mirrors 17 and 17' of FIG. 1 can be tailored, for example, to achieve operation at any desired wavelength pair over a preselected range of wavelengths. Similarly, the spectral reflectivity of the reflective elements of other embodiments of this inventive concept can be chosen to provide multifrequency operation at any pair of wavelengths for which there is net gain.

Figure 4:
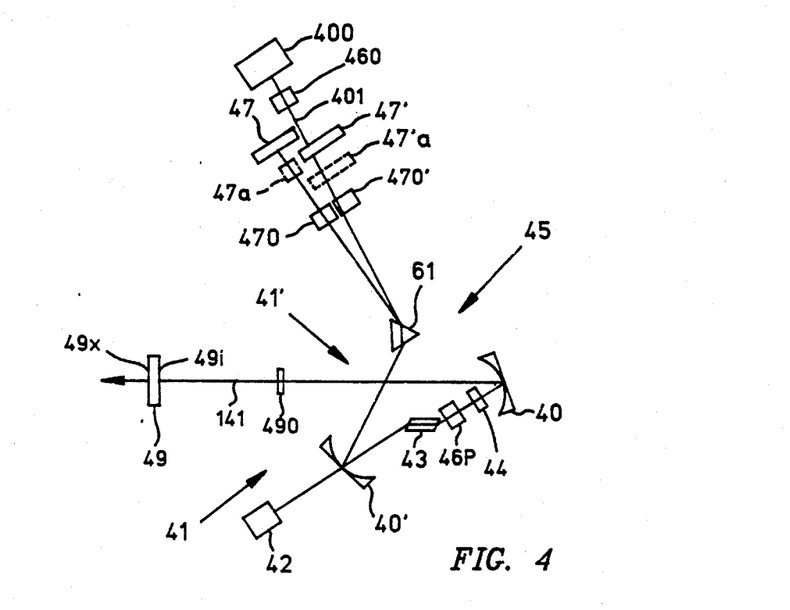
FIG. 4 represents a first embodiment of the invention.

A first embodiment of this inventive concept is illustrated in FIG. 4. For ease of understanding this concept, the intracavity sum frequency generation process will be described in terms of Type II sum frequency generation of 808 nm and 1.064$\mu$ fundamental wavelengths to produce 459 nm. However, it is to be understood that within the scope of this inventive concept any pair of wavelengths can be summed to produce a third wavelength given by equation 1. In order to achieve efficient intracavity sum frequency generation in the device shown in FIG. 1, several important modifications need to be introduced into the basic design. Intracavity sum frequency generation proceeds by operating laser 41 shown in FIG. 4 at 808 nm and 1.064$\mu$ simultaneously. This is achieved by applying a unique set of coatings to the reflective elements contained in laser resonator cavity 45. Ten centimeter radius of curvature fold mirrors 40' and 40 have coatings which are highly reflective at both 808 nm and 1.064$\mu$ for the appropriate angle of incidence. In this exemplary case this angle of incidence is 14 degrees and refers to the angle of incidence of laser resonator mode 141 with respect to the normal to the surface of 10 centimeter radius concave fold mirrors 40 and 40'.

Mirror 49 is a flat mirror with an interior surface 49$i$ coated to be highly reflective at 808 nm and 1.064$\mu$ and simultaneously highly transmissive at 459 nm. The rear surface of mirror 49, indicated as 49$x$ in FIG. 4, is anti-reflective coated for 459 nm radiation. This mirror then serves as the output coupler for only 459 nm sum frequency generated output from laser 41. Red mirror 47' is coated to be highly reflective at 1.064$\mu$ while blue mirror 47 is coated to be highly reflective at 808 nm.

Prism 61 is one or more prisms made in this exemplary case of Schott glass SF 55. The important criteria for the prism material is that it has high dispersion and extremely low absorption at both 808 nm and 1.064$\mu$. Dispersion refers to the refractive index variation with optical wavelength. Many glasses which satisfy the condition of high dispersion also have high absorption losses, particularly at 1.064$\mu$. While numerous glasses may be satisfactory for this application, Schott SF 55 glass is used in this exemplary case because it is readily available in the high optical quality required for intracavity laser operation. In addition, it has high dispersion and has very low absorption losses at both 808 nm and 1.064$\mu$. Laser gain element 43 in this exemplary case is a 0.15 percent doped $Ti^{3+}$:sapphire laser rod with Brewster angle faces. It is 1.5 centimeters long.

The nonlinear optical crystal used for sum frequency generation is KTP crystal 44. In this exemplary case it is cut for Type II non-critically phased matched sum frequency generation at 808 nm and 1.064μ. The KTP crystal used in this exemplary case was flux grown, XYZ cut and is 5 mm long. The propagation direction is along the Y axis. The 1.064μ radiation is polarized normal to the Z axis. Both faces of KTP crystal 44 were anti-reflective coated for both 808 nm and 1.064μ.

The faces of the KTP crystal were not anti-reflective coated for 459 nm. In addition, samples of KTP contain impurities or defects that cause absorption in the visible region. Both absorption at 459 nm and reflection from each surface of the KTP crystal were measured. A series of measurements were performed and the calculated reflectivity was 0.36 per surface. The measured loss introduced by the KTP crystal at 459 nm was somewhat uncertain, ranging from $4.91 \times 10^{-2}$ to $6.93 \times 10^{-2}$ per pass. Absorption of visible radiation by KTP is a result of poor crystal quality and in principle, this absorption can be reduced to zero by the introduction of compensating impurities or by better crystal growth techniques.

Since the sum frequency generation process is Type II, the polarization of the two fundamental wavelengths must be orthogonal in the KTP crystal. The Ti:sapphire gain is highest for the orientation of E parallel to c and the Brewster angles on the end faces of the rods support the $\pi$ polarization. Thus, in the absence of polarization rotation the 1.064μ and 808 nm radiation would have parallel polarizations throughout the resonator. This is inefficient for Type II sum frequency generation. To provide the proper orientation of the polarization within the resonator, a multiple order wave plate 46P was inserted between the laser crystal 43 and the nonlinear KTP crystal 44. This wave plate produces an integral number of full wave polarization rotations at 808 nm and an integral number of half-wave rotations at 1.064μ.

The insertion of the wave plate has the following effect on the polarization of the two fundamental wavelengths at 1.064μ and 808 nm. As these wavelengths emerge from Ti:sapphire gain element 43, propagating toward the KTP crystal 44, their polarization is parallel. This is required for high gain within the Ti:sapphire laser crystal. As a consequence of passing through wave plate 46P, the polarization at 808 nm is unchanged relative to its initial polarization within the Ti:sapphire laser crystal, while the polarization of the 1.064μ radiation is rotated 90 degrees by the wave plate. Therefore, as these two fundamental wavelengths propagate into the KTP crystal 44, their polarizations are orthogonal as required by Type II nonlinear sum frequency generation process. KTP crystal 44 does not change the polarization orientation of the two wavelengths so that as they emerge from KTP crystal 44, the polarizations remain perpendicular with respect to one another.

Thus, as the waves continue to propagate to concave fold mirror 40 and to flat mirror 49, the orientation of the two fundamental wavelengths remain perpendicular. Reflections by mirror 49 also does change the orientation of the two polarizations, so that the two fundamental wavelengths reflected by mirror 49 back towards KTP crystal 44 remain perpendicular. This perpendicular orientation is maintained for the reflected wave as it propagates through KTP crystal 44 towards wave plate 46P.

As a consequence of the reflected wave passing through wave plate 46P towards the Ti:sapphire crystal, the polarization orientation of the two fundamental wavelengths are changed once more. Upon emerging from wave plate 46P propagating towards Ti:sapphire laser gain element 43, the 808 nm polarization orientation is again unchanged, but the 1.064μ radiation is once again rotated by 90 degrees. Now, it matches the original polarization orientation that it had on emerging from Ti:sapphire laser 43 in the direction of KTP crystal 44. Therefore, the wave reflected by mirror 49 upon passing through wave plate 46P re-orients the polarization of the two fundamental wavelengths to be parallel once again, allowing high gain for both wavelengths upon passing through laser gain element 43.

As a result of the location of multi-order wave plate 46P in this inventive concept, the two fundamental wavelengths have orthogonal polarizations in both propagation directions through nonlinear sum frequency generating crystal KTP 44, but have parallel ($\pi$) polarization in the Ti:sapphire crystal. This allows for both efficient sum frequency generation by the KTP crystal and efficient laser operation at both wavelengths due to the gain of the Ti:sapphire laser.

It should be noted that a multiple order wave plate which rotates the 1.064μ radiation by an integral number of full wave rotations (180°) and rotates the 808 nm radiation by an integral number of half wave rotations (90°) will produce the same benefits as the wave plate described in the proceeding paragraph. That is, in this case, the two fundamental wavelengths will have orthogonal polarization in both propagation directions through nonlinear KTP crystal 44 and parallel polarization in the Ti: sapphire crystal. However, since it is required that the 1.064μ radiation be polarized normal to the Z axis of the KTP crystal, the use of the half wave plate which rotates the polarization of the 808 nm radiation rather than the 1.064μ requires an accommodating rotation of the KTP crystal by 90 degrees around the axis parallel to the laser resonator mode 141. This allows the KTP Z axis to be aligned normal to the 1.064μ radiation. In all other respects the use of either type of wave plate will produce identical results. The wave plate itself 46P is anti-reflective coated on its input and exit faces for 808 nm and 1.064μ.

As has been mentioned previously, simultaneous operation at two wavelengths is difficult when the net gain at one wavelength is substantially different than the net gain at the other. This is the case for Ti:sapphire where the stimulated emission cross-section at 808 nm is approximately five times greater than that at 1.064μ. In order to achieve simultaneous operation at both wavelengths, then, additional modifications need to be provided to the basic resonator design shown in FIG. 1. Initially, laser 41 shown in FIG. 4 was operated at 1.064μ by blocking feedback mirror 47. This verified that the alignment was correct and that there was indeed sufficient gain at 1.064μ to provide single wavelength operation. However, when mirror 47, which provides feedback for the 808 nm radiation, was unblocked the 1.064μ radiation was extinguished and could not be produced simultaneously.

Attempts to reduce the net gain at 808 nm proved successful in providing simultaneous operation at both 808 nm 1.064μ. Two techniques were utilized. One replaced highly reflective mirror 47 with a 98 percent reflective mirror 47 which allowed approximately 230 mW at 808 nm to exit the laser resonator. A second technique used a 4 percent reflective element 47a placed between highly reflective blue mirror 47 and prism element 61. These techniques were successful in terms of providing simultaneously CW operation by essentially making the 1.064μ transition competitive with the 808 nm transition.

While these two techniques were successful in allowing simultaneous operation at the two required fundamental wavelengths for sum frequency generation, they are obtained by reducing the overall efficiency of the laser; that is, by "spoiling" the Q of the laser at 808 nm. The 1.064μ transition is achieved simultaneously with the 808 nm transition but at a reduced intracavity 808 nm fluence. Since the efficiency of sum frequency generation is a function of the intracavity power density, any technique which reduces the intracavity fluence at either wavelength required for sum frequency generation will reduce the efficiency of the sum frequency generating process. Therefore, a technique to increase the gain at 1.064μ will allow simultaneous cw operation at 808 nm and 1.064μ while at the same time enhancing the efficiency of the intracavity sum frequency generation process.

Increasing the gain at 1.064μ makes this transition more competitive with the 808 nm transition in Ti:sapphire and therefore enhances the ability of the 1.064μ transition to operate simultaneously with the 808 nm transition in a single gain element. While the insertion of an intracavity 1.064μ optical amplifier 47'a between prism 61 and highly reflective red mirror 47' would produce the desired enhancement of the 1.064μ transition, a simpler means of accomplishing this is achieved by injecting a 1.064μ coherent optical signal through red mirror 47'. This injected signal, labeled 401 in FIG. 4, should be mode matched for optimum efficiency. Mode matching requires that the spatial profile of the injected signal inside laser resonator 41' be identical to the laser resonator mode that is established naturally as a result of the reflective elements in laser resonator 41'. That is to say, without the injection signal a laser resonator mode 141 is established in laser resonator cavity 45. This laser resonator mode can be described as an electromagnetic field distribution that reproduces itself in relative shape and in relative phase after a round trip through the laser resonator. The injected signal 401 emerging injection laser source 400 and passing through mirror 47' should have a spatial distribution essentially identical to the spatial distribution that is established within laser resonator cavity 45.

The effect of injecting a mode matched optical signal at 1.064μ into laser resonator 41' is to, in essence, increase the gain at 1.064μ. The key feature is that as a consequence of establishing an extracting fluence within laser resonator 41' at 1.064μ which results from the injected signal 401 passing into, and being mode matched to, laser resonator mode 141, the extraction efficiency at that wavelength is enhanced. This makes the transition more competitive with the 808 nm transition than it would be in the absence of an injected signal. In this manner, simultaneous operation at 1.064μ and 808 nm may be achieved.

The source of 1.064μ radiation 400 in FIG. 4 can be any laser that emits 1.064μ. For example, this can be a diode pumped or lamp pumped Nd:YAG laser. Very high output powers are not required for laser source 400. This laser must be a CW laser source.

It is important to note that the sum frequency generated power $P_3$ at 459 nm is a function of the product of the power at both fundamental wavelengths. The optimum generated power at 459 nm using sum frequency generation can be written as:

$$P_3 = 3.35 \, l_c \, h \, P_1 \, P_2 \qquad (2)$$

where $P_3$ is the total generated power at 459 nm in mW, $P_1$ and $P_2$ are the fundamental powers in Watts, $l_c$ is the KTP crystal length in mm and h is a dimensionless focusing parameter. This expression can be obtained from the literature. See, for example, S. Singh, in *Handbook of Laser Science and Technology*, M. J. Weber, Ed., CRC Press, Boca Raton, Fla., vol. 3, pp. 3–21, 1986. The constant in equation (2) is obtained from the values for KTP reported in the literature. See, for example, J.-C. Baumert, F. M. Schellenberg, W. Lenth, W. P. Risk and G. C. Bjorklund, *Appl. Phys. Lett.*, vol. 51, p. 2192, 1987. The KTP absorption at 459 nm is taken into account in equation (2) by including in the constant term (3.35) the additional term $\exp[\frac{1}{2}\alpha l_c]$ where $\alpha$ is the absorption coefficient of KTP at 459 nm calculated from the transmission measurement noted above. Although there is some uncertainty in this measurement the exponential term varies only from 0.97 to 0.98 for the range of $\alpha$ reported. The value of h can be determined from the literature, see, for example, G. D. Boyd and D. A. Kleinman, *Journal of Applied Physics*, vol. 39, p. 3597, 1968, and is a function of the ratio of the KTP length to the confocal parameter b. The confocal parameter is $$b = 2\pi w_0^2 \left( \frac{n_2}{\lambda} \right) \qquad (3)$$

where $w_0^2$ is the [$1/e^2$] spot radius, $n_2$ is the refractive index of KTP at 808 nm along the Z axis (1.84), and $\lambda$ is the wavelength. Assuming no double refraction, h is 0.56.

If $P_1$ in equation (2) represents the 808 nm fluence, then $P_2$ in equation (2) represents the 1.064μ intracavity fluence. It can be seen from equation (2) that there is a great advantage to having the fluences $P_1$ and $P_2$ approximately equal compared to the situation where one or the other fluence strongly dominates. This, of course, assumes that $P_1 + P_2$, the two fundamental powers, are constant. For example, if $P_1$ is 1 W and $P_2$ is 1 mW, the product $P_1 P_2$ is $1 \times 10^{-3}$ W$^2$. On the other hand, if $P_1 = P_2 = 500$ mW, then the product $P_1 P_2$ is $2.5 \times 10^{-1}$ W$^2$. Therefore, the situation where both $P_1$ and $P_2$ are 500 mW will produce 250 times as much 459 nm sum frequency generated output than the situation where $P_1$ is 1 W and $P_2$ is 1 mW, although in both cases the sum of the intracavity powers is identical and approximately equal to 1 W.

Therefore for efficient intracavity sum frequency generation it is required that the intracavity fluence, which is the direct function of (among other things) the optical pump power, be distributed as evenly as possible between the two fundamental wavelengths. Note that in the numerical example cited above the sum frequency generated power $P_3$ in the case where $P_1$ is 1 W and $P_2$ is 1 mW is identical to the situation where $P_1 = P_2 = 30$ mW, all other factors being the same. Therefore, with an intracavity power of 60 mW distributed evenly between $P_1$ and $P_2$, essentially the same sum frequency generated power is produced as when $P_1+P_2=1$ W. That is, 941 mW in the case where $P_1$ is 1 W and $P_2$ is 1 mW are wasted based on the conversion efficiency shown by equation (2).

It can be shown from simple calculus that when $P_1+P_2$ is constant, the product $P_1P_2$ is maximized when $P_1=P_2$. Therefore, the sum frequency generated power produced at 459 nm will be maximized when the intracavity fluence which, as indicated previously, depends upon the pump fluence from argon ion pump laser 42, is equally distributed between the two fundamental wavelengths, 808 nm and 1.064μ in this exemplary case. Injecting a signal at 1.064μ through red highly reflective element 47' in FIG. 4, which is mode matched to laser resonator mode 141, establishes a standing wave at 1.064μ to produce extracting fluence for the population inversion created by argon ion pump laser 42 pumping laser gain crystal 43. The explanation for this phenomenon is that by virtue of the injected signal the net gain within the gain element at the injected wavelength is increased substantially relative to the net gain at that wavelength in the absence of the injected signal. As a consequence, the injected signal wavelength can effectively compete for the population inversion within the gain element with a higher gain transition.

Depending upon the intensity of the injected signal 100 percent locking may be achieved. 100 percent locking refers to the case where the net gain at the injected wavelength is enhanced to the point where the free running laser wavelength cannot compete. Therefore, the spectral output of laser 41 when it is injection locked is dominated by the injection locked frequency and, in fact, only this frequency is produced. At lower injected powers a partial injection locking is produced. In this case, both the injected laser wavelength and the free running laser wavelengths are produced simultaneously.

The desired situation in the laser resonator shown in FIG. 4 can be described in injection locking terminology. Partial injection locking is desired wherein both the free running laser wavelength, which is 808 nm, competes with the 1.064μ laser transition, but neither dominates. This requires careful spatial alignment of injection laser source 400 with laser resonator mode 141. In addition spatial mode matching between the output of injection laser source 400 and laser resonator mode 141 must be effected. Since the laser resonator mode 141 is collimated in the region between laser prism 61 and highly reflective red mirror 47', spatial mode matching simply requires a collimated beam of spatial dimensions similar to the spatial dimension of the collimated beam within the region between laser prism 61 and highly reflective red mirror 47'. The mode diameter in this region is approximately 1 mm in this exemplary case.

A low power laser diode pumped CW 1.064μ Nd:YAG laser was used in this exemplary case as injection locking laser source 400. Approximately 4 mW was produced by this laser and was incident upon highly reflective red mirror 47'. Because laser resonator 41' is resonant for mode matched, spatially aligned 1.064μ radiation from injection source 400, the highly reflective surfaces of all reflecting elements in laser resonator cavity 45 and the gain of laser crystal 43 at 1.064μ produce a higher intracavity fluence at 1.064μ than the 4 mW output of the injection source. The intracavity fluence at 1.064μ was approximately 3 W. The unidirectional intracavity power at 808 nm was measured to be 7.92 Watts.

Figure 5:
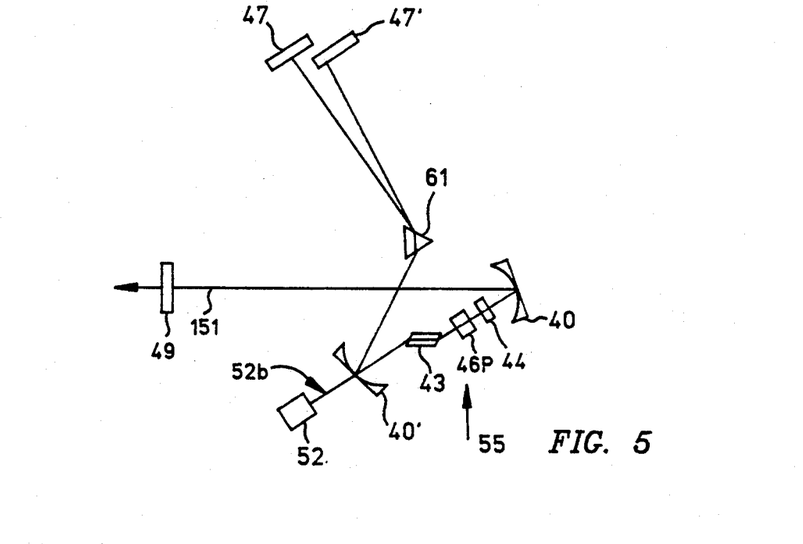
FIG. 5 represents a second embodiment of the invention.

An alternate means of increasing the effective gain at 1.064μ is shown in FIG. 5. In this case argon ion pump laser 42 of FIG. 4 is replaced with a doubled Nd:YAG laser 52 operating at 532 nm. The pump efficiency of laser 52 in FIG. 5 is comparable to the pump efficiency of the argon ion pump laser since the 532 nm pump wavelength is near the absorption maximum for $Ti^{3+}$ in sapphire. Typically, a doubled Nd:YAG laser output 52b contains both 532 nm radiation as well as the residual or un-doubled fundamental wavelength at 1.064μ. Intracavity doubling of CW Nd:YAG lasers is generally 10 to 50 percent efficient, leaving between 50 to 90 percent of the original 1.064μ fluence unconverted.

Means are normally provided in doubled Nd:YAG lasers to filter out or otherwise remove the fundamental 1.064μ radiation from the 532 nm green output. However, the inventive concept illustrated in FIG. 5 takes advantage of the unconverted 1.064μ fundamental radiation co-propagating with the 532 nm doubled Nd:YAG laser output. Using appropriate spatial mode matching techniques described previously in relation to FIG. 4, the 1.064μ radiation introduced into laser resonator cavity 55 by pump laser 52 can be mode matched to laser resonator mode 151 shown in FIG. 5.

In this case, a separate injection laser source at 1.064μ is not used. This type of intracavity sum frequency generation has several advantages compared with the concept illustrated in FIG. 4. For one, a separate injection laser source is not required. In addition, because the 1.064μ radiation introduced into the cavity is comparable to, and in some cases exceeds, the 532 nm pump radiation, typically several Watts of 1.064μ radiation will be introduced into laser resonator cavity 55. This allows a greater tolerance for misalignment and spatial mismatch of the 1.064μ injected radiation. As little as 1 percent of the injected signal may be sufficient to produce comparable intracavity fluences at 1.064μ relative to 808 nm. In addition, it can be seen that using a CW doubled Nd:YAG laser to pump a Ti:sapphire laser in the traditional manner is inefficient to the extent that the 1.064μ radiation is filtered out of the pump beam and is unused. However, for the intracavity sum frequency generation concept illustrated in FIG. 5, the 1.064μ radiation is used to produce 1.064μ injection signal, increasing the intracavity fluence at 1.064μ and enhancing the sum frequency generation efficiency.

Amplitude modulation at 459 nm may be obtained in a number of ways. Referring back to FIG. 4, a modulator 460 may be placed between injection laser source 400 and highly reflective red mirror 47'. Modulating the injection source amplitude modulates the intracavity fluence at 1.064μ. Referring to equation (2), amplitude modulation of $P_2$ produces direct modulation in $P_3$, the sum frequency generated output power. Alternately, modulator 460 can be placed within laser resonator cavity 45. An ideal location would be between laser prism 61 and highly reflective red mirror 47'. This option is not shown in FIG. 4.

In either event, the maximum modulation frequency is determined by the photon lifetime of 1.064μ radiation within the laser resonator. The photon lifetime is determined by the intracavity losses including reflective losses at 1.064μ and refers to the time for the intracavity power to decay to 1/e of its initial value when there is no gain in the cavity. The photon lifetime affects the modulation rate directly as a consequence of the fact that immediately and instantaneously eliminating injection beam 401 at 1.064μ in FIG. 4 does not have an instantaneous effect on the intracavity fluence at 1.064μ circulating as laser resonator mode 141. This intracavity fluence slowly decays as a function of time. Maximum modulation rates, therefore, using this technology are limited to approximately 100 MHz. Furthermore, once again noting equation (2) and the fact that as $P_2$ decreases, $P_1$ increases, the amplitude dependence of $P_3$, the sum frequency generated power, is not a linear function of the amplitude of $P_2$.

The linewidth was measured for both fundamental wavelengths and the generated blue 459 nm output for laser 41 illustrated in FIG. 4. With no means inserted within the laser resonator cavity 45 to narrow the linewidth, the linewidth at 808 nm was 0.03 nm while at 1.064μ the linewidth was 0.17 nm. The width of the 459 nm output was 0.06 nm. To narrow the linewidth of the 459 nm generated output, a single 0.5 mm thick exemplary etalon plate 490 was inserted in the collimated arm of the resonator between output coupler 49 and concave fold mirror 40. In this region the resonator mode is collimated and both wavelengths are spatially superimposed. Thus the single 0.5 mm thick exemplary etalon plate simultaneously narrows the bandwidth of both wavelengths.

With this etalon plate utilized in laser 41 illustrated in FIG. 4, the linewidth at 459 nm was measured to be 1 picometer. Unfortunately, this width was resolution limited as the means used to measure the linewidth had a resolution of 1 picometer. Some tunability of the blue wavelength is obtained by tuning the short wavelength fundamental about 808 nm. Wavelength tuning is achieved by rotating highly reflective blue flat mirror 47 while maintaining a fixed angle for red mirror 47'. Wavelengths from 457.16 nm to 460.13 nm were obtained, giving a tuning range of about 3 nm.

A laser in accordance with this inventive concept has a wide range of applications, including various medical, sensing, pollution monitoring, laser ranging, aircraft wind speed and wind shear measurement applications, surveillance and communications.

It should therefore be readily be understood that many modifications and variations of the present invention are possible within the purview of the claimed invention. It is therefore to be understood that within the scope of the appended claims the invention may be practiced otherwise than as specifically described.

I claim:

1. A laser generating two wavelengths within a preselected range of wavelengths for producing a third wavelength by sum frequency generation comprising:
   a resonator for said two wavelengths within said preselected range of wavelengths defining a laser cavity by two highly reflective flat elements, two highly reflective concave fold mirror elements and an output coupler reflective element arranged to form a reflective path for a laser resonator mode in said laser cavity;
   a dispersing prism disposed in said laser cavity between one of said concave fold mirrors and said two highly reflective flat elements to spatially disperse said two wavelengths, said dispersing prism and said two highly reflective flat elements being aligned in a manner such that each of said two highly reflective flat elements defines a discrete end portion of a separate one of two resonant paths in said laser cavity, each of said two resonant paths for a discrete one of said two wavelengths in said preselected range of wavelengths;
   a laser gain element disposed in said laser cavity to produce a laser emission;
   means for optically exciting said laser gain element in an end pumping mode to produce said laser emission that includes said two wavelengths in said preselected range of wavelengths; and
   a nonlinear optical crystal located between said two concave fold mirrors, having the property to generate said third wavelength being the sum frequency of said two wavelengths.

2. The laser of claim 1 in which said laser gain element is a solid state gain element.

3. The laser of claim 2 in which said solid state gain element is a Ti:sapphire gain element.

4. The laser of claim 2 in which said solid state gain element is a crystalline material that includes a host material doped with activator ions to produce said laser emission in said preselected range of wavelengths when said crystal is optically excited by end pumping thereof.

5. The laser of claim 4 in which said host material is a sapphire host material and said activator ions in said sapphire host material include a dopant of $Ti^{3+}$ ions to enable said crystalline material to produce said laser emission within the wavelength range from about 680 nm to 1.1μ when said solid state gain element is optically excited by said optically exciting means.

6. The laser of claim 1 in which said laser gain element is a liquid gain element.

7. The laser of claim 6 in which is a liquid gain element is a dye solution gain element.

8. The laser of claim 1 in which said laser gain element is a gaseous gain element.

9. The laser of claim 1 in which said laser gain element is a semiconductor gain element.

10. The laser of claim 1 further including:
    means disposed in said laser cavity for narrowing the linewidth of at least one of said two wavelengths operating simultaneously in said laser.

11. The laser of claim 10 in which said means for narrowing includes two etalon plates of different thicknesses disposed in said laser cavity.

12. The laser of claim 10 in which said means for narrowing includes a single etalon plate disposed in said laser cavity to simultaneously narrow both of said two wavelengths.

13. The laser of claim 1 in which each of said two wavelengths is linearly polarized and the polarization of each of said two wavelengths are parallel within said laser gain element.

14. The laser of claim 13 in which said nonlinear optical crystal is configured for Type II sum frequency generation, and further including:
    means disposed in said laser cavity for rotating the polarization of one of said two wavelengths 90 degrees with respect to the other wavelength of said two wavelengths, said polarization rotation to be effective within said nonlinear optical crystal but not in said laser gain element.

15. The laser of claim 14 in which said polarization rotating means is a multiple order wave plate.

16. The laser of claim 14 in which said nonlinear optical crystal is a KTP crystal with crystal faces parallel to the crystalline X, Y and Z axes.

17. The laser of claim 13 in which said laser gain element is a solid state gain element with Brewster cut end faces to provide a polarized laser mode within said laser cavity.

18. The laser of claim 1 further including:
means for injecting a mode matched optical signal at one of said two wavelengths into said laser for promoting laser oscillation at said one of said two wavelengths.

19. The laser of claim 18 in which said means for injecting is a Nd:YAG laser.

20. The laser of claim 1 in which one region of said laser resonator mode containing both of said two wavelengths is aligned to allow both of said two wavelengths to be spatially collinear.

21. The laser of claim 1 in which at least one of said two highly reflective flat elements is rotatable to provide for a tunable said sum frequency third wavelength.

22. The laser of claim 1 in which said means for optically exciting said laser gain element is an argon ion laser.

23. The laser of claim 1 in which said means for optically exciting said laser gain element is a doubled Nd:YAG laser.

24. The laser of claim 23 in which said Nd:YAG laser produces both the fundamental and second harmonic wavelengths, the fundamental harmonic wavelength is mode matched to said laser resonator mode to produce an injection locking effect in said laser.

25. The laser of claim 1 in which said laser cavity contains a laser resonator mode part of which is collimated and another part of which is focused to a small waist within said laser gain element.

26. The laser of claim 25 in which said nonlinear optical crystal for said generating said sum frequency is placed near the focused said small waist within said laser gain element.

27. The laser of claim 1 in which one of said two wavelengths is approximately 808 nm and the other wavelength of said two wavelengths is $1.064\mu$, said nonlinear optical crystal for said generating said sum frequency is a Type II KTP crystal and said sum frequency third wavelength is 459 nm.

* * * * *